(12) United States Patent
Robinson

(10) Patent No.: US 12,184,364 B2
(45) Date of Patent: *Dec. 31, 2024

(54) COMMUNICATION SYSTEM AND METHODS USING VERY LARGE MULTIPLE-IN MULTIPLE-OUT (MIMO) ANTENNA SYSTEMS WITH EXTREMELY LARGE CLASS OF FAST UNITARY TRANSFORMATIONS

(71) Applicant: Rampart Communications, Inc., Linthicum Heights, MD (US)

(72) Inventor: Matthew Brandon Robinson, Millersville, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,671

(22) Filed: Oct. 26, 2023

(65) Prior Publication Data

US 2024/0072854 A1 Feb. 29, 2024

Related U.S. Application Data

(63) Continuation of application No. 17/695,703, filed on Mar. 15, 2022, now Pat. No. 11,838,078, which is a
(Continued)

(51) Int. Cl.
*H04B 7/04* (2017.01)
*H04B 7/0456* (2017.01)
*H04B 7/0491* (2017.01)

(52) U.S. Cl.
CPC ......... *H04B 7/0456* (2013.01); *H04B 7/0491* (2013.01)

(58) Field of Classification Search
CPC .. H04B 7/0456; H04B 7/0491; H04B 7/0473; H04B 7/0413; H04L 25/0246; H04L 25/0248
(Continued)

(56) References Cited

U.S. PATENT DOCUMENTS 5,237,587 A 8/1993 Schoolcraft
5,345,599 A 9/1994 Paulraj et al.
(Continued)

FOREIGN PATENT DOCUMENTS

CN 1061312 A 5/1992
CN 1168611 A 12/1997
(Continued)

OTHER PUBLICATIONS

Extended European Search Report for European Application No. EP23204173.1 dated Feb. 7, 2024, 11 pages.
(Continued)

*Primary Examiner* — Emmanuel Bayard

(57) ABSTRACT

An apparatus includes a first communication device with multiple antennas, operably coupled to a processor and configured to access a codebook of transformation matrices. The processor generates a set of symbols based on an incoming data, and applies a permutation to each of the symbols to produce a set of permuted symbols. The processor transforms each of the permuted symbols based on at least one primitive transformation matrix, to produce a set of transformed symbols. The processor applies, to each of the transformed symbols, a precode matrix selected from the codebook of transformation matrices to produce a set of precoded symbols. The codebook of transformation matrices is accessible to a second communication device. The processor sends a signal to cause transmission, to the second communication device, of multiple signals, each represent-
(Continued)

ing a precoded symbol from the set of precoded symbols, each of the signals transmitted using a unique antenna from the plurality of antennas.

20 Claims, 7 Drawing Sheets

Related U.S. Application Data continuation of application No. 17/142,702, filed on Jan. 6, 2021, now Pat. No. 11,336,341, which is a continuation of application No. 16/580,722, filed on Sep. 24, 2019, now Pat. No. 10,965,352.

(58) Field of Classification Search
USPC ................................ 375/262, 267, 299, 347
See application file for complete search history.

(56) References Cited

U.S. PATENT DOCUMENTS

| | | |
|---|---|---|
| 5,555,268 A | 9/1996 | Fattouche et al. |
| 6,389,138 B1 | 5/2002 | Li et al. |
| 6,519,278 B1 | 2/2003 | Hiramatsu |
| 6,526,037 B1 | 2/2003 | Song et al. |
| 6,973,124 B2 | 12/2005 | Miller |
| 7,075,968 B1 | 7/2006 | Ghassemzadeh et al. |
| 7,330,496 B2 | 2/2008 | Ohmi et al. |
| 7,376,173 B2 | 5/2008 | Yedidia et al. |
| 7,454,084 B2 | 11/2008 | Faber et al. |
| 8,254,476 B2 | 8/2012 | Ohwatari et al. |
| 8,320,507 B2 | 11/2012 | Higuchi |
| 8,737,509 B2 | 5/2014 | Yu et al. |
| 8,780,771 B2 | 7/2014 | Kim et al. |
| 9,648,444 B2 | 5/2017 | Agee |
| 10,020,839 B2 | 7/2018 | Robinson et al. |
| 10,491,262 B2 | 11/2019 | Robinson et al. |
| 10,637,705 B1 | 4/2020 | Shattil |
| 10,735,062 B1 | 8/2020 | Robinson |
| 10,771,128 B1 | 9/2020 | Sitaram et al. |
| 10,819,387 B2 | 10/2020 | Robinson et al. |
| 10,833,749 B1 | 11/2020 | Robinson |
| 10,873,361 B2 | 12/2020 | Robinson |
| 10,917,148 B2 | 2/2021 | Robinson |
| 10,951,442 B2 | 3/2021 | Robinson |
| 10,965,352 B1* | 3/2021 | Robinson ............. H04B 7/0473 |
| 11,018,715 B2 | 5/2021 | Robinson et al. |
| 11,025,470 B2 | 6/2021 | Robinson |
| 11,050,604 B2 | 6/2021 | Robinson |
| 11,075,681 B2 | 7/2021 | Robinson |
| 11,159,220 B2 | 10/2021 | Robinson |
| 11,258,487 B2 | 2/2022 | Robinson |
| 11,336,341 B2 | 5/2022 | Robinson |
| 11,394,588 B2 | 7/2022 | Robinson |
| 11,476,912 B2 | 10/2022 | Robinson |
| 11,641,269 B2 | 5/2023 | Robinson |
| 11,716,131 B2 | 8/2023 | Robinson |
| 11,838,078 B2 | 12/2023 | Robinson |
| 2001/0012316 A1 | 8/2001 | Maruyama |
| 2002/0009209 A1 | 1/2002 | Inoue et al. |
| 2003/0185309 A1 | 10/2003 | Pautler et al. |
| 2003/0210750 A1 | 11/2003 | Onggosanusi et al. |
| 2004/0059547 A1 | 3/2004 | Aftelak |
| 2004/0105489 A1 | 6/2004 | Kim et al. |
| 2004/0253986 A1 | 12/2004 | Hochwald et al. |
| 2005/0169374 A1 | 8/2005 | Marpe et al. |
| 2006/0023803 A1 | 2/2006 | Perlman et al. |
| 2006/0109897 A1 | 5/2006 | Guo et al. |
| 2006/0274825 A1 | 12/2006 | Cioffi et al. |
| 2007/0091999 A1 | 4/2007 | Nissan-Cohen et al. |
| 2007/0097856 A1 | 5/2007 | Wang et al. |
| 2007/0098063 A1 | 5/2007 | Reznic et al. |
| 2007/0115797 A1 | 5/2007 | Reznic et al. |
| 2007/0211786 A1 | 9/2007 | Shattil |
| 2007/0211816 A1 | 9/2007 | Hwang |
| 2007/0281746 A1 | 12/2007 | Takano et al. |
| 2008/0095262 A1 | 4/2008 | Ho et al. |
| 2008/0285667 A1 | 11/2008 | Mondal et al. |
| 2008/0317104 A1 | 12/2008 | Akcaba et al. |
| 2009/0046801 A1 | 2/2009 | Pan et al. |
| 2009/0268840 A1 | 10/2009 | Clerckx et al. |
| 2009/0316802 A1 | 12/2009 | Tong et al. |
| 2010/0008432 A1 | 1/2010 | Kim et al. |
| 2010/0067605 A1 | 3/2010 | Jongren |
| 2010/0111219 A1 | 5/2010 | Wang et al. |
| 2010/0119001 A1 | 5/2010 | Walton et al. |
| 2010/0150266 A1 | 6/2010 | Mondal et al. |
| 2010/0202553 A1 | 8/2010 | Kotecha et al. |
| 2010/0246656 A1 | 9/2010 | Hammerschmidt |
| 2010/0329393 A1 | 12/2010 | Higuchi |
| 2011/0134902 A1 | 6/2011 | Ko et al. |
| 2011/0235728 A1 | 9/2011 | Karabinis |
| 2012/0093090 A1 | 4/2012 | Han et al. |
| 2012/0236817 A1 | 9/2012 | Chen et al. |
| 2012/0257664 A1 | 10/2012 | Yue et al. |
| 2012/0307937 A1 | 12/2012 | Higuchi |
| 2013/0064315 A1 | 3/2013 | Heath, Jr. et al. |
| 2013/0100965 A1 | 4/2013 | Ohmi et al. |
| 2013/0129008 A1 | 5/2013 | Ko et al. |
| 2013/0194961 A1 | 8/2013 | Kang et al. |
| 2013/0223548 A1 | 8/2013 | Kang et al. |
| 2014/0056332 A1 | 2/2014 | Soualle et al. |
| 2015/0003500 A1 | 1/2015 | Kesling |
| 2015/0049713 A1 | 2/2015 | Lan et al. |
| 2015/0124897 A1 | 5/2015 | Phan Huy |
| 2015/0171982 A1 | 6/2015 | Wang et al. |
| 2015/0304130 A1 | 10/2015 | Logothetis et al. |
| 2016/0277083 A1 | 9/2016 | Koike-Akino et al. |
| 2016/0309396 A1 | 10/2016 | Chai et al. |
| 2016/0337156 A1 | 11/2016 | Milleth et al. |
| 2017/0180020 A1 | 6/2017 | Namgoong et al. |
| 2017/0195030 A1 | 7/2017 | Yoshimura et al. |
| 2017/0201321 A1 | 7/2017 | Uysal et al. |
| 2017/0237545 A1 | 8/2017 | Khandani |
| 2017/0288902 A1 | 10/2017 | Rusek et al. |
| 2017/0294946 A1 | 10/2017 | Wang et al. |
| 2017/0302415 A1 | 10/2017 | Park et al. |
| 2017/0331539 A1 | 11/2017 | Pham et al. |
| 2018/0138939 A1 | 5/2018 | Robinson et al. |
| 2019/0075091 A1 | 3/2019 | Shattil et al. |
| 2019/0097694 A1 | 3/2019 | Jeon et al. |
| 2019/0115960 A1 | 4/2019 | Jiang et al. |
| 2019/0158206 A1* | 5/2019 | Li ....................... H04J 13/0048 |
| 2019/0165840 A1* | 5/2019 | Murakami ........ H04L 25/03942 |
| 2019/0215222 A1 | 7/2019 | Cheng et al. |
| 2019/0260444 A1 | 8/2019 | Hauzner et al. |
| 2019/0268035 A1 | 8/2019 | Robinson et al. |
| 2019/0280719 A1 | 9/2019 | Yu |
| 2019/0349042 A1 | 11/2019 | Ramireddy et al. |
| 2019/0349045 A1 | 11/2019 | Varatharaajan et al. |
| 2019/0379430 A1 | 12/2019 | Pekoz et al. |
| 2020/0007204 A1 | 1/2020 | Jeon et al. |
| 2020/0014407 A1 | 1/2020 | Smith et al. |
| 2020/0028617 A1 | 1/2020 | Landis et al. |
| 2020/0162123 A1 | 5/2020 | Robinson et al. |
| 2020/0366333 A1 | 11/2020 | Robinson |
| 2021/0006288 A1 | 1/2021 | Robinson et al. |
| 2021/0006303 A1 | 1/2021 | Robinson |
| 2021/0006317 A1 | 1/2021 | Robinson |
| 2021/0006446 A1 | 1/2021 | Robinson |
| 2021/0006451 A1 | 1/2021 | Robinson |
| 2021/0013936 A1 | 1/2021 | Zhu et al. |
| 2021/0036901 A1 | 2/2021 | Robinson |
| 2021/0067211 A1 | 3/2021 | Robinson |
| 2021/0091830 A1 | 3/2021 | Robinson |
| 2021/0159950 A1 | 5/2021 | Robinson |
| 2021/0184899 A1 | 6/2021 | Robinson |
| 2021/0250075 A1 | 8/2021 | Robinson |
| 2021/0409193 A1 | 12/2021 | Robinson |
| 2022/0006504 A1 | 1/2022 | Robinson |
| 2022/0209831 A1 | 6/2022 | Robinson |
| 2022/0353114 A1 | 11/2022 | Robinson |

(56) References Cited

U.S. PATENT DOCUMENTS

| | | |
|---|---|---|
| 2023/0015280 A1 | 1/2023 | Robinson |
| 2023/0224143 A1 | 7/2023 | Robinson |

FOREIGN PATENT DOCUMENTS

| | | |
|---|---|---|
| CN | 1273721 A | 11/2000 |
| CN | 1312620 A | 9/2001 |
| CN | 1703863 A | 11/2005 |
| CN | 1813435 A | 8/2006 |
| CN | 1841953 A | 10/2006 |
| CN | 101047417 A | 10/2007 |
| CN | 101179539 A | 5/2008 |
| CN | 101222470 A | 7/2008 |
| CN | 101321059 A | 12/2008 |
| CN | 101395875 A | 3/2009 |
| CN | 101510799 A | 8/2009 |
| CN | 101715641 A | 5/2010 |
| CN | 101795257 A | 8/2010 |
| CN | 102122980 A | 7/2011 |
| CN | 102804623 A | 11/2012 |
| CN | 103338168 A | 10/2013 |
| CN | 103609047 A | 2/2014 |
| CN | 103634065 A | 3/2014 |
| CN | 103716111 A | 4/2014 |
| CN | 103957086 A | 7/2014 |
| CN | 104618293 A | 5/2015 |
| CN | 105007625 A | 10/2015 |
| CN | 105337714 A | 2/2016 |
| CN | 105515658 A | 4/2016 |
| CN | 106953671 A | 7/2017 |
| CN | 107040341 A | 8/2017 |
| CN | 107113124 A | 8/2017 |
| CN | 107251499 A | 10/2017 |
| CN | 107276716 A | 10/2017 |
| CN | 110176951 A | 8/2019 |
| EP | 1514355 A1 | 3/2005 |
| EP | 1566909 A1 | 8/2005 |
| EP | 1826915 A1 | 8/2007 |
| EP | 1883168 A2 | 1/2008 |
| EP | 2961080 A1 | 12/2015 |
| EP | 3211812 A1 | 8/2017 |
| JP | 2002232391 A | 8/2002 |
| JP | 2003198500 A | 7/2003 |
| JP | 2007124301 A | 5/2007 |
| JP | 2012170110 A | 9/2012 |
| JP | 2013162293 A | 8/2013 |
| JP | 2014183460 A | 9/2014 |
| KR | 20080026010 A | 3/2008 |
| KR | 20100131373 A | 12/2010 |
| KR | 20110028993 A | 3/2011 |
| KR | 20120040138 A | 4/2012 |
| KR | 20130093465 A | 8/2013 |
| KR | 20130118525 A | 10/2013 |
| KR | 20180043719 A | 4/2018 |
| TW | 200820650 A | 5/2008 |
| WO | WO-9200639 A1 | 1/1992 |
| WO | WO-2006025382 A1 | 3/2006 |
| WO | WO-2006078687 A2 | 7/2006 |
| WO | WO-2008024773 A2 | 2/2008 |
| WO | WO-2008098225 A2 | 8/2008 |
| WO | WO-2009099013 A1 | 8/2009 |
| WO | WO-2010101097 A1 | 9/2010 |
| WO | WO-2010111194 A1 | 9/2010 |
| WO | WO-2010147443 A2 | 12/2010 |
| WO | WO-2012141227 A1 | 10/2012 |
| WO | WO-2014014576 A1 | 1/2014 |
| WO | WO-2015186531 A1 | 12/2015 |
| WO | WO-2016132873 A1 | 8/2016 |
| WO | WO-2017027469 A1 | 2/2017 |
| WO | WO-2018089985 A1 | 5/2018 |
| WO | WO-2021003054 A1 | 1/2021 |
| WO | WO-2021003072 A1 | 1/2021 |
| WO | WO-2021003204 A1 | 1/2021 |
| WO | WO-2021021703 A1 | 2/2021 |
| WO | WO-2021046104 A1 | 3/2021 |
| WO | WO-2021061604 A1 | 4/2021 |
| WO | WO-2021162974 A1 | 8/2021 |

OTHER PUBLICATIONS

Ishikawa, E., et al., "An Implementation of Butterfly Network on Partially Dynamically Reconfigurable FGPA", 2007 IEICE General Conference (2007); vol. 1, pp. 190; 4 pages with English translation.

Office Action and search report for Chinese Application No. CN202080061735 mailed Feb. 28, 2024, 8 pages.

Office Action and Search report for Chinese Application No. CN202080074980.3 dated Apr. 4, 2024, 8 pages.

Office Action and Search Report for Chinese Application No. CN20208054209 dated Mar. 12, 2024, 8 pages.

Office Action and Search report for Chinese Patent Application No. CN202110526855.8 dated Mar. 7, 2024, 13 pages.

Office Action for European Application No. EP20742591.9 dated Jan. 29, 2024, 7 pages.

Office Action for European Patent Application No. EP21707588.6 dated Feb. 16, 2024, 7 pages.

Office Action for Indian Patent Application No. IN202217000418 dated Feb. 12, 2024, 7 pages.

Office Action for Israel Application No. IL290241 dated Feb. 25, 2024, 4 pages.

Office Action for Japanese Patent Application No. JP2021578092 dated Mar. 7, 2024, 11 pages.

Office Action for Japanese Patent Application No. JP2022518908 dated Feb. 14, 2024, 6 pages.

Office Action for Korean Application No. KR1020227006756 dated Jan. 29, 2024, 27 pages.

Office Action for Korean Application No. KR20227003443 dated Feb. 23, 2024, 7 pages.

Zhu, X., et al., "Transforming the distribution of OFDM signals for peak-to-average power ratio reduction", European Transactions on Telecommunications (2010); 21(4): 352-362.

Final Office Action for U.S. Appl. No. 17/845,965 dated Jan. 17, 2024, 23 pages.

Heath, R. W., et al., "On quasi-orthogonal signatures for CDMA systems", IEEE Transactions on Information Theory (2006); 52(3): 1217-1226.

Office Action for European Application No. EP20743505 dated Jan. 2, 2024, 7 pages.

Office Action for Japanese Application No. 20220149034 dated Nov. 24, 2023, 11 pages.

Office Action for Korean Application No. KR20227003438 mailed Dec. 14, 2023, 10 pages.

[Author Unknown] "3rd Generation Partnership Project; Technical Specification Group Radio Access Network; Evolved Universal Terrestrial Radio Access (E-UTRA); Physical channels and modulation (Release 12)", Advanced Lte, 3GPP TS 36.211, V12.9.0, Technical Specification (Mar. 19, 2017); 136 pages.

Alian, Ehsan Haj Mirza, et al., "A phase adjustment approach for interference reduction in OFDM-based cognitive radios", IEEE Transactions on Wireless Communications (2013); 12(9): 4668-4679.

[Author Unknown] "Signature design for NoMA", Ericsson, 3GPP TSG-RAN WG1 Meeting #93, Tdoc R1-1806241, Agenda Item: 7.4.1, Busan, South Korea (May 21-25, 2018); 5 pages.

[Author Unknown] "Signature Design for NoMA", Ericsson, 3GPP TSG-RAN1 #92, R1-1802767, Agenda Item: 7.4.1, Athens, Greece (Feb. 26-Mar. 2, 2018); 8 pages.

[Author Unknown] "UL RS via OZCL Sequences", Sharp, 3GPP TSG-RAN WG1#49bis, R1-072719, Agenda Item: 5.11.2; Orlando, USA (Jun. 25-29, 2007); 16 pages.

Chinese Office Action for Chinese Application No. 201780079040.1 dated Sep. 22, 2020, 12 pages with English translation.

European Application No. 17870211.4, Extended European Search Report mailed Jun. 30, 2020; 8 pages.

European Application No. 17870211.4, Office Action mailed Dec. 15, 2021; 5 pages.

(56) References Cited

OTHER PUBLICATIONS

European Application No. 17870211.4, Office Action mailed Jun. 22, 2023; 5 pages.
European Application No. 20740468.2, Office Action mailed Nov. 30, 2022; 12 pages.
European Application No. EP 20743505.8, Office Action dated Dec. 7, 2022; 7 pages.
Fang, S., et al., "Non-Unitary Precoding Base on Codebook for Multi-User MIMO System with Limited Feedback", Journal of Electronics and Information (2008); 30(10): 2419-2422.
Fu, M., et al., "Single User Geometric Mean Decomposition Hybrid Precoding for Massive Multiple-input Multiple-output Millimeter Wave System", Science Technology and Engineering (2019); 19(11); 160-166.
Huang et al., "Multi-dimensional encryption scheme based on physical layer for fading channel," IET Communications, Oct. 2018, vol. 12, Issue 19, pp. 2470-2477.
Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.
Huo and Gong, "A New Efficient Physical Layer OFDM Encryption Scheme," IEEE Infocom 2014, IEEE Conference on Computer Communications, pp. 1024-1032.
International Preliminary Report on Patentability for International Application No. PCT/US2020/043686, mailed Feb. 10, 2022, 16 pages.
International Preliminary Report on Patentability for International Application No. PCT/US2020/049031, mailed on Mar. 8, 2022, 15 pages.
International Preliminary Report on Patentability for International Application No. PCT/US2020/051927, mailed on Apr. 7, 2022, 14 pages.
International Preliminary Report on Patentability for International Application No. PCT/US2021/017043, mailed Aug. 25, 2022, 9 pages.
International Preliminary Report on Patentability for PCT Application No. PCT/US2017/061489, mailed May 14, 2019, 6 pages.
International Preliminary Report on Patentability in International Application No. PCT/US2020/039879 dated Jan. 13, 2022, 8 pages.
International Preliminary Report on Patentability in International Application No. PCT/US2020/039606 dated Jan. 13, 2022, 13 pages.
International Preliminary Report on Patentability in International Application No. PCT/US2020/040393 dated Jan. 13, 2022, 9 pages.
International Search Report and Written Opinion for International Application No. PCT/US2020/039606, mailed Nov. 25, 2020, 18 pages.
International Search Report and Written Opinion for International Application No. PCT/US2020/039879, mailed Oct. 9, 2020, 10 pages.
International Search Report and Written Opinion for International Application No. PCT/US2020/040393, mailed Sep. 3, 2020, 12 pages.
International Search Report and Written Opinion for International Application No. PCT/US2020/043686, mailed Dec. 3, 2020, 24 pages.
International Search Report and Written Opinion for International Application No. PCT/US2020/049031, mailed Jan. 18, 2021, 20 pages.
International Search Report and Written Opinion for International Application No. PCT/US2020/051927, mailed Jan. 15, 2021, 19 pages.
International Search Report and Written Opinion for International Application No. PCT/US2021/017043 dated May 14, 2021, 10 pages.
International Search Report and Written Opinion for PCT Application No. PCT/US2017/061489, mailed Feb. 26, 2018, 8 pages.
Invitation to Pay Additional Fees for International Application No. PCT/US2020/039606 dated Sep. 21, 2020, 12 pages.
Invitation to Pay Additional Fees for International Application No. PCT/US2020/043686 dated Oct. 7, 2020, 16 pages.
Invitation to Pay Additional Fees for International Application No. PCT/US2020/049031 dated Nov. 11, 2020, 13 pages.
Japanese Office Action for Japanese Application No. 2019-546787 mailed Aug. 12, 2022; 4 pages with Translation.
Japanese Office Action for Japanese Application No. 2019-546787 mailed Mar. 31, 2022; 5 pages with Translation.
Japanese Office Action for Japanese Application No. 2019-546787 mailed Nov. 9, 2021, 19 pages with Translation.
Jisheng, P., et al., "Linear precoding design for MIMO channels with finite alphabet constraints", Gaojishu Tongxin/Chinese High Technology Letters (2013); 23(11): 1117-1123.
Kamle, U., et al., "Performance evaluation of new multi level spreading codes for DS CDMA communication over Rayleigh fading channel", 2013 International Conference on Advances in Computing, Communications and Informatics (ICACCI), Mysore, India (2013); 649-654.
Kim, J., "PAPR Reduction of OFDM by Unitary Transformation", TeleCIS Wireless, Inc., IEEE (Nov. 2002); 19 pages.
Korean Office Action for Korean Application No. 10-2019-7016867 dated Dec. 20, 2021, 11 pages with English translation.
Korean Office Action for Korean Application No. 10-2022-7032222 dated Mar. 24, 2023, 11 pages with English translation.
Lan, Pang-Chang, et al., "Unitary modulation for secrecy enhancement in multi-antenna wireless systems with only CSIT", 2015 IEEE International Conference on Communication Workshop (ICCW) IEEE (Jun. 8, 2015); pp. 417-422.
Liu et al., "Piecewise Chaotic Permutation Method for Physical Layer Security in OFDM-PON," IEEE Photonics Technology Letters, Nov. 2016, vol. 28, No. 21, pp. 2359-2362.
Ma et al., "Secure Communication in TDS-OFDM System Using Constellation Rotation and Noise Insertion," IEEE Transactions on Consumer Electronics, Aug. 2010, vol. 56, No. 3, pp. 1328-1332.
Non Final Office Action for U.S. Appl. No. 17/695,703 dated Jan. 19, 2023, 16 pages.
Non-Final Office Action for U.S. Appl. No. 16/916,303 mailed on Jun. 20, 2022, 14 pages.
Non-Final Office Action for U.S. Appl. No. 17/845,965 mailed on Sep. 27, 2023, 23 pages.
Non-Final Office Action for U.S. Appl. No. 16/459,254 dated Nov. 5, 2020, 9 pages.
Office Action and Search Report for Chinese Application No. CN202080054209 dated Oct. 20, 2023, 12 pages.
Office Action and search report for Chinese Application No. CN202080061735 mailed Aug. 16, 2023, 16 pages.
Office Action and Search Report for Chinese Application No. CN202080074980.3 dated Oct. 18, 2023, 26 pages.
Office Action and Search Report for Chinese Application No. CN20208061350 dated Nov. 13, 2023, 33 pages.
Office Action and search report for Chinese Application No. CN202110526855 mailed Aug. 18, 2023, 12 pages.
Office Action for Canadian Application No. CA20203145735 dated Oct. 19, 2023, 4 pages.
Office Action for Canadian Application No. CA20203145809 dated Oct. 17, 2023, 4 pages.
Office Action for Canadian Application No. CA3043340 dated Aug. 10, 2023, 4 pages.
Office Action for European Application No. 20803304.3 dated Mar. 17, 2023, 13 pages.
Office Action for European Application No. EP20742591 dated Dec. 22, 2022, 5 pages.
Office Action for European Application No. EP20742591.9 mailed Aug. 24, 2023, 6 pages.
Office Action for European Application No. EP20743505.8 dated Jun. 20, 2023, 7 pages.
Office Action for European Application No. EP20757057 dated May 3, 2023, 9 pages.
Office Action for European Application No. EP20803304.3 dated Oct. 16, 2023, 13 pages.
Office Action for European Application No. EP21707588.6 dated Aug. 4, 2023, 6 pages.

(56) References Cited

OTHER PUBLICATIONS

Office Action for Indian Application No. IN202117061533 dated Aug. 24, 2023, 6 pages.
Office Action for Indian Application No. IN202117061534 dated Oct. 5, 2023, 7 pages.
Office Action for Japanese Application No. JP20210578092 mailed Sep. 6, 2023, 11 pages.
Office Action for Japanese Application No. JP2021578070 dated Jun. 9, 2023, 9 pages.
Office Action for Japanese Application No. JP2022518908 dated Aug. 31, 2023, 20 pages.
Office Action for Korean Application No. KR1020237030135 dated Nov. 21, 2023, 17 pages.
Office Action for Korean Application No. KR20227003438 mailed Aug. 9, 2023, 7 pages.
Office Action for Korean Application No. KR20227003443 mailed Jul. 4, 2023, 13 pages.
Office Action for Korean Application No. KR20227003443 mailed Sep. 15, 2023, 15 pages.
Office Action for Korean Application No. KR20227032222 dated Oct. 25, 2023, 5 pages.
Office Action for Korean Application No. KR20237030137 mailed Nov. 21, 2023, 12 pages.
Office Action for Korean Application No. KR20237030140 mailed Nov. 21, 2023, 16 pages.
Saito, Y., et al., "An efficient random unitary matrix for biometric template protection." 2016 Joint 8th International Conference on Soft Computing and Intelligent Systems (SCIS) and 2016 17th International Symposium on Advanced Intelligent Systems (ISIS), IEEE (2016); 366-370.
Strohmer et al., "Grassmannian frames with applications to coding and communication," Appl. Comput. Harmon. Anal. (2003); 14: 257-275.
Sun, Q., et al., "A New Binary Equiangular Tight Frame Based on Steiner System", Communication Technology (Feb. 2017); 50(2): 220-223; 4 pages with English Abstract.
Sung et al., "M-PSK Codebook Based Clustered MIMO-OFDM SDMA with Efficient Codebook Search," IEEE, 2012, 5 pages.
Tang, J., "Research on Vector Quantization Codebook Design and Application", Dissertation submitted to University of Science and Technology of China, China Academic Journal Electronic Publishing House (Oct. 2006); 156 pages with English Abstract.
Tseng et al., "Hardware Implementation of the Joint Precoding Sub-System and MIMO Detection Preprocessor in IEEE 802.11n/ac WLAN," Journal of Signal Processing Systems (2019); 91: 875-884.
Tsiligianni et al., "Construction of Incoherent Unit Norm Tight Frames With Application to Compressed Sensing," IEEE Transactions on Information Theory, Apr. 2014, vol. 60, No. 4. pp. 2319-2330.
U.S. Appl. No. 15/351,428: Ex Parte Quayle Action, mailed Jan. 11, 2018; 6 pages.
U.S. Appl. No. 16/403,757: Ex Parte Quayle Action, mailed Jul. 11, 2019; 6 pages.
U.S. Appl. No. 16/416,144: Office Action, mailed Dec. 27, 2019; 14 pages.
U.S. Appl. No. 16/416,144: Office Action, mailed May 5, 2020; 14 pages.
U.S. Appl. No. 16/459,245: Office Action, mailed Jan. 3, 2020; 8 pages.
U.S. Appl. No. 16/459,245: Office Action, mailed Jun. 12, 2020; 8 pages.
U.S. Appl. No. 16/527,240: Office Action, mailed Jun. 22, 2020; 11 pages.
U.S. Appl. No. 16/527,240: Requirement for Restriction/Election, mailed Apr. 16, 2020; 6 pages.
U.S. Appl. No. 16/560,447: Ex Parte Quayle Action, mailed Mar. 20, 2020; 5 pages.
U.S. Appl. No. 16/580,722: Office Action, mailed Apr. 22, 2020; 11 pages.
U.S. Appl. No. 16/690,769: Office Action, mailed Mar. 3, 2020; 9 pages.
U.S. Appl. No. 17/027,144: Office Action, mailed Oct. 15, 2020; 9 pages.
U.S. Appl. No. 17/142,702: Office Action, mailed Oct. 28, 2021; 11 pages.
U.S. Appl. No. 17/161,118: Office Action, mailed Nov. 10, 2021; 37 pages.
U.S. Appl. No. 17/845,965: Requirement for Restriction/Election, mailed Apr. 24, 2023; 6 pages.
Via, J., et al., "Optimal precoding for a novel RF-MIMO scheme in transmit correlated Rayleigh channels", 2009 IEEE 10th Workshop on Signal Processing Advances in Wireless Communications (2009); 334-338.
Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.
Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.
Zheng, M., "Study on codebook-based MIMO system limited feedback precoding technology", CMFD, 2019, p. 1-98.

* cited by examiner

COMMUNICATION SYSTEM AND METHODS USING VERY LARGE MULTIPLE-IN MULTIPLE-OUT (MIMO) ANTENNA SYSTEMS WITH EXTREMELY LARGE CLASS OF FAST UNITARY TRANSFORMATIONS

CROSS-REFERENCE TO RELATED APPLICATIONS

This application is a Continuation of U.S. patent application Ser. No. 17/695,703, filed Mar. 15, 2022 and titled "COMMUNICATION SYSTEM AND METHODS USING VERY LARGE MULTIPLE-IN MULTIPLE-OUT (MIMO) ANTENNA SYSTEMS WITH EXTREMELY LARGE CLASS OF FAST UNITARY TRANSFORMATIONS," which is a Continuation of patent application Ser. No. 17/142,702, filed Jan. 6, 2021 and titled "COMMUNICATION SYSTEM AND METHODS USING VERY LARGE MULTIPLE-IN MULTIPLE-OUT (MIMO) ANTENNA SYSTEMS WITH EXTREMELY LARGE CLASS OF FAST UNITARY TRANSFORMATIONS," now U.S. Pat. No. 11,336,341, which is a Continuation of U.S. patent application Ser. No. 16/580,722, filed Sep. 24, 2019 and titled "COMMUNICATION SYSTEM AND METHODS USING VERY LARGE MULTIPLE-IN MULTIPLE-OUT (MIMO) ANTENNA SYSTEMS WITH EXTREMELY LARGE CLASS OF FAST UNITARY TRANSFORMATIONS," now U.S. Pat. No. 10,965,352, which is related to U.S. Pat. No. 10,020,839, issued on Jul. 10, 2018 and titled "RELIABLE ORTHOGONAL SPREADING CODES IN WIRELESS COMMUNICATIONS," and to U.S. patent application Ser. No. 16/459,262, filed on Jul. 1, 2019 and titled "COMMUNICATION SYSTEM AND METHOD USING LAYERED CONSTRUCTION OF ARBITRARY UNITARY MATRICES," and to U.S. patent application Ser. No. 16/527,240, filed on Jul. 31, 2019 and titled "COMMUNICATION SYSTEM AND METHOD USING UNITARY BRAID DIVISIONAL MULTIPLEXING (UBDM) WITH PHYSICAL LAYER SECURITY (PLS)," the disclosures of each of which are incorporated by reference herein in their entireties for all purposes.

STATEMENT REGARDING FEDERAL GOVERNMENT INTEREST

This United States Government holds a nonexclusive, irrevocable, royalty-free license in the invention with power to grant licenses for all United States Government purposes.

TECHNICAL FIELD

This description relates to systems and methods for transmitting wireless signals for electronic communications and, in particular, to increasing the data rate of, and reducing the computational complexity of, wireless communications performed via a very large number of antennas.

BACKGROUND

In multiple access communications, multiple user devices transmit signals over a given communication channel to a receiver. These signals are superimposed, forming a combined signal that propagates over that communication channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communication channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communication channel, the sine waves represented by those symbols are superimposed to form a combined signal that is received at the receiver.

SUMMARY

An apparatus includes a first communication device with multiple antennas, operably coupled to a processor and configured to access a codebook of transformation matrices. The processor generates a set of symbols based on an incoming data, and applies a permutation to each of the symbols to produce a set of permuted symbols. The processor transforms each of the permuted symbols based on at least one primitive transformation matrix, to produce a set of transformed symbols. The processor applies, to each of the transformed symbols, a precode matrix selected from the codebook of transformation matrices to produce a set of precoded symbols. The codebook of transformation matrices is accessible to a second communication device. The processor sends a signal to cause transmission, to the second communication device, of multiple signals, each representing a precoded symbol from the set of precoded symbols, each of the signals transmitted using a unique antenna from the plurality of antennas.

The details of one or more implementations are set forth in the accompanying drawings and the description below. Other features will be apparent from the description and drawings, and from the claims.

DETAILED DESCRIPTION

Figure 1:
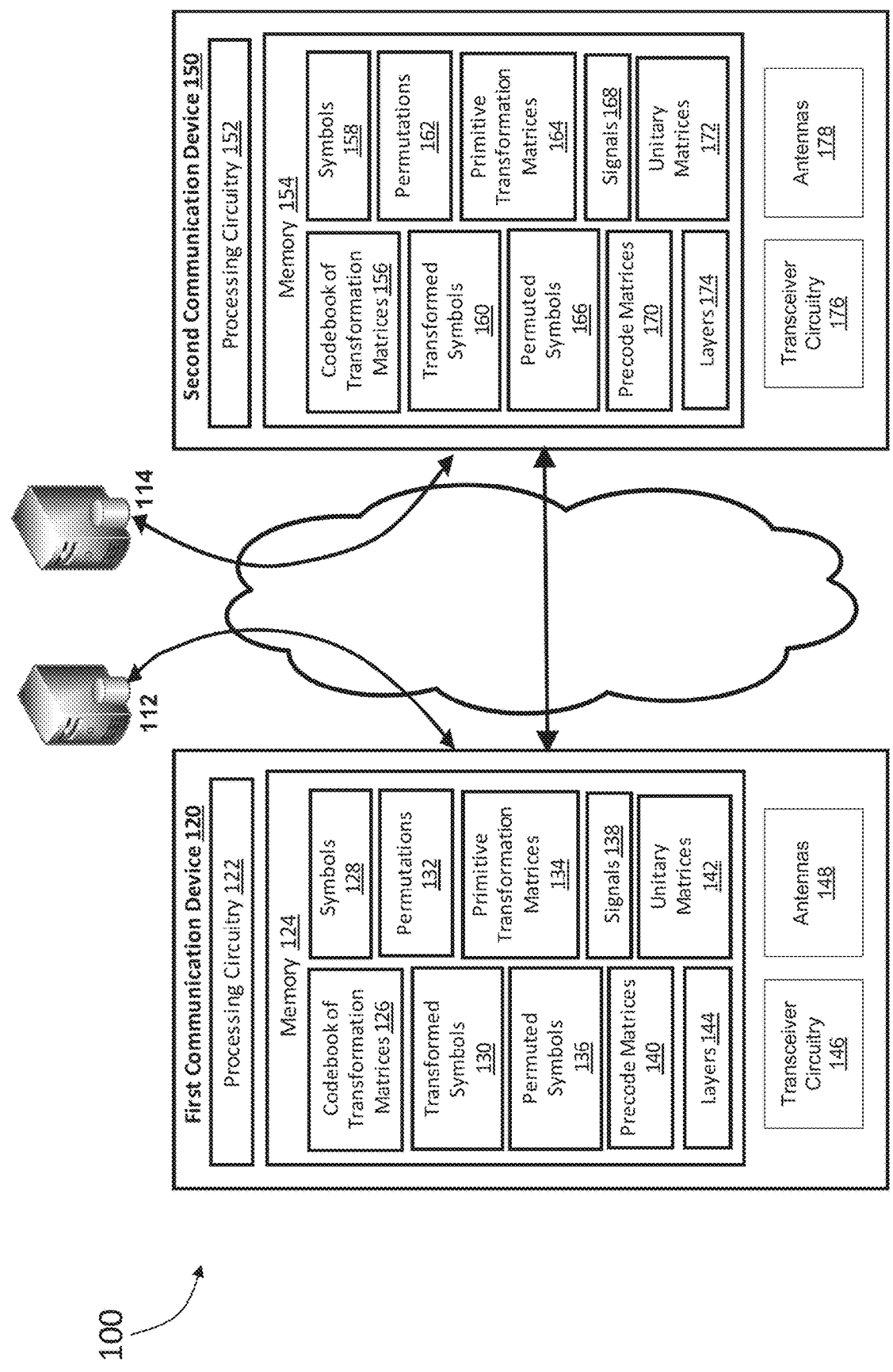
FIG. 1 is a block diagram illustrating an example very large multiple-in multiple-out (MIMO) communications system for fast spatial unitary transformation, according to an embodiment.

Some multiple-in multiple-out (MIMO) communications systems include transmitters and receivers that apply a unitary transformation across multiple spatial antennas, with the specific unitary matrices applied being determined by a processor, based on the communication channel (e.g., a physical transmission medium over which signals are sent, such as free space, having multi-path and other environmental characteristics). The unitary matrices can be selected from a codebook of essentially random unitary matrices. Such approaches are adequate for most known MIMO systems because most known MIMO systems include a relatively small number of antennas (2-4 antennas is common). As data requirements and the demand for spatial diversity and spatial multiplexing increase, however, the number of desired communication channels increases. As a result, the number of associated unitary pre-multiplications and post-multiplications performed at the transmitter (Tx) and receiver (Rx) can also increase. Since the number of matrix multiplications increases as $O(N^2)$, this increase in complexity can become computationally expensive/prohibitive. The "O" in the expression $O(N^2)$ is "Big O" mathematical notation, indicating the approximate value that the relevant function/operation approaches.

Embodiments set forth herein can achieve improved-efficiency MIMO communications through the construction of codebooks of fast unitary matrices and their application to spatial diversity/MIMO systems for MIMO-precoding. In U.S. patent application Ser. No. 16/459,262, filed on Jul. 1, 2019 and titled "COMMUNICATION SYSTEM AND METHOD USING LAYERED CONSTRUCTION OF ARBITRARY UNITARY MATRICES," a technique is discussed for applying an extremely large class of "fast" unitary matrices for transforming modulated symbols in the frequency domain (e.g., replacing an inverse Fast Fourier transform (iFFT)), prior to transmission of the symbols. An "extremely large class" of fast unitary matrices can refer to a class including between $2^{400}$ and $2^{20,000}$ (e.g., $2^{8,000}$) fast unitary matrices. Systems and methods of the present disclosure extend the construction and implementation of "fast" unitary operators outside the context of the frequency domain, for orthogonal frequency-division multiplexing (OFDM) systems. OFDM is a method of encoding digital data on multiple carrier frequencies.

Because fast unitary matrices are relatively dense in the full unitary group (i.e., the full set of possible unitary matrices), it is possible to design a suitable codebook of potential channel matrices out of the fast unitary matrices, and, in turn, to engineer much larger MIMO systems than would otherwise be possible. Embodiments set forth herein include the construction of channel matrix codebooks out of fast unitary matrices (also referred to herein as "operators" or "transformations"), such that much larger MIMO systems can be designed without the computational complexity of naive unitary spatial transformations. As used herein, a "fast" or "high-speed" transformation refers to one that can be performed using work that is on the order of no worse than $O(N \log N)$ or $O(K \log K)$ floating point operations (e.g., given an N×K matrix).

MIMO systems typically employ a process referred to as "pre-coding." Details about MIMO pre-coding can be found, for example, in "Practical Physical Layer Security Schemes for MIMO-OFDM Systems Using Precoding Matrix Indices" by Wu, Lan, Yeh, Lee, and Cheng, published in IEEE Journal on Selected Areas in Communications (Vol. 31, Issue 9, September 2013), the entire contents of which are herein incorporated by reference in their entirety for all purposes. To illustrate, consider that Alice and Bob (a pair of communicating entities) agree to a "codebook" of unitary matrices (i.e., a stored collection of unitary matrices) available for use during communications. Alice transmits a training sequence to Bob, and Bob can determine the channel matrix H based on the training sequence. From channel matrix H, Bob can use the generalized channel capacity to determine which unitary matrix in the codebook maximizes capacity, and transmit only the bits labeling that matrix back to Alice. Alice can then pre-multiply, or "pre-code," every baud she transmits from that point on with the appropriate unitary matrix from the codebook). Bob then multiplies by the remaining unitary singular matrix, and scales out the singular values. Matrices in the codebook can be selected pseudo-randomly. An efficiency benefit can be realized using pseudo-randomly selected matrices (i.e., without identifying/using the exact matrices), given the associated reduction in the volume of bits being transmitted.

The pre-coded/pre-multiplied unitary matrices are applied across space, not across frequency or time. In other words, if t antennas are all transmitting at the same time, and the desired symbols to be transmitted are $\bar{b}=(b_1, \ldots, b_t)$, and the precode matrix is F, then the first antenna actually transmits the second antenna transmits $$\sum_{n=1}^{t} F_{1n} b_n,$$

the second antenna transmits $$\sum_{n=1}^{t} F_{2n} b_n,$$

and so on. The foregoing illustrates the application of a spatial unitary matrix.

A similar procedure can be performed in conjunction with the unitary matrices in fast Unitary Braid Divisional Multiplexing (fUBDM) (discussed in detail in U.S. patent application Ser. No. 16/527,240, filed on Jul. 31, 2019 and titled "Communication System and Method Using Unitary Braid Divisional Multiplexing (UBMD) with Physical Layer Security (PLS)," incorporated herein by reference). For example, suppose that the symbols to be transmitted on the $n^{th}$ antenna are $$\bar{b}^n = (b_1^n, \ldots, b_N^n),$$

and the fUBDM unitary on the $n^{th}$ antenna is $A^n$. Then the transmitter first computes $$\bar{s}^n = A^n \bar{b}^n$$

for every n. The symbols $\bar{s}^n$ are what are actually being transmitted on the $n^{th}$ antenna. Then, when the receiver is ready to transmit the t values $\bar{s}^n$ for n=1, . . . , t, the transmitter computes the values $$F\bar{s}^n = FA^n\bar{b}n$$

and transmits those.

Consider the following example. Suppose that N=2 and t=2, and the first antenna uses the matrix $A_1$ and the second antenna uses the matrix $A_2$, where $$A_1 = \frac{1}{\sqrt{2}}\begin{pmatrix} 1 & 1 \\ -1 & 1 \end{pmatrix}, \quad (0.0.1)$$

and $$A_2 = \frac{1}{2}\begin{pmatrix} 1 & \sqrt{3} \\ \sqrt{3} & -1 \end{pmatrix}. \quad (0.0.2)$$

Consider also that the space-time matrix is:

$$F = \frac{1}{2}\begin{pmatrix} \sqrt{3} & -1 \\ 1 & \sqrt{3} \end{pmatrix}. \quad (0.0.3)$$

Next, suppose that the first antenna is going to transmit the symbols $(b_1^1, b_2^1)$, and the second antenna is going to transmit $(b_1^2, b_2^2)$. First, both antennas spread their symbols, such that the first antenna computes $$A_1\bar{b}^1 \frac{1}{\sqrt{2}}\begin{pmatrix} 1 & 1 \\ -1 & 1 \end{pmatrix}\begin{pmatrix} b_1^1 \\ b_2^1 \end{pmatrix} = \frac{1}{\sqrt{2}}\begin{pmatrix} b_1^1 + b_2^1 \\ -b_1^1 + b_2^1 \end{pmatrix}, \quad (0.0.4)$$

and the second antenna computes $$\frac{1}{2}\begin{pmatrix} 1 & \sqrt{3} \\ \sqrt{3} & -1 \end{pmatrix}\begin{pmatrix} b_1^2 \\ b_2^2 \end{pmatrix} = \frac{1}{2}\begin{pmatrix} b_1^2 + \sqrt{3}b_2^2 \\ \sqrt{3}b_1^2 - b_2^2 \end{pmatrix}. \quad (0.0.5)$$

When it is time to transmit, the antennas will apply the spatial unitary across the components. If the spatial unitary F was the identity matrix, then at the first time slot the first antenna would transmit $$\frac{1}{\sqrt{2}}(b_1^1 + b_2^1),$$

and the second antenna would simultaneously transmit $$\frac{1}{2}(b_1^2 + \sqrt{3}b_2^2).$$

Because F is not the identity matrix, however, for the first time slot the transmitters will compute:

$$F\begin{pmatrix} \frac{1}{\sqrt{2}}(b_1^1 + b_2^1) \\ \frac{1}{2}(b_1^2 + \sqrt{3}b_2^2) \end{pmatrix} = \frac{1}{2}\begin{pmatrix} \sqrt{3} & -1 \\ 1 & \sqrt{3} \end{pmatrix}\begin{pmatrix} \frac{1}{\sqrt{2}}(b_1^1 + b_2^1) \\ \frac{1}{2}(b_1^2 + \sqrt{3}b_2^2) \end{pmatrix} = \quad (0.0.6)$$

$$\frac{1}{2}\begin{pmatrix} \frac{\sqrt{3}}{\sqrt{2}}(b_1^1 + b_2^1) - \frac{1}{2}(b_1^2 + \sqrt{3}b_2^2) \\ \frac{1}{\sqrt{2}}(b_1^1 + b_2^1) - \frac{\sqrt{3}}{2}(b_1^2 + \sqrt{3}b_2^2) \end{pmatrix}.$$

The first antenna transmits the first value $$-\frac{\sqrt{3}}{\sqrt{2}}(b_1^1 + b_2^1) - \frac{1}{2}(b_1^2 + \sqrt{3}b_2^2),$$

and the second antenna simultaneously transmits the second value $$\frac{1}{\sqrt{2}}(b_1^1 + b_2^1) + \frac{\sqrt{3}}{2}(b_1^2 + \sqrt{3}b_2^2).$$

Then, at the second time slot, the transmitter computes $$F\begin{pmatrix} \frac{1}{\sqrt{2}}(-b_1^1 + b_2^1) \\ \frac{1}{2}(\sqrt{3}b_1^2 - b_2^2) \end{pmatrix} = \cdots \quad (0.0.7)$$

The values at (0.0.7) are the two values that the first transmitter and the second transmitter will transmit, respectively, simultaneously during the second time slot.

Once these values are transmitted through a communication channel, the effect of F will be removed by the communication channel. This illustrates the reason this process is called "precoding," as it involves the application of the inverse of at least a portion of what the communication channel is going to do. When the receiver receives the transmitted signals, there will be no need to remove the precoding portions, because the communication channel has effectively removed them. The receiver will then scale out the singular values and then remove the other singular vectors, then apply the inverse of the generator matrices $A_1$ and $A_2$.

An example of the scaling out of the singular values is as follows: In response to a signal "T" being transmitted, the receiver receives HT, where "H" represents the channel matrix. If the singular value decomposition of H is H=BDA t (where the t superscript indicates conjugate transpose), then the receiver receives (BDA$^t$)T. If T was selected to be Ab, where A is the same unitary as in the channel (similar to matrix "F" in the preceding discussion), and b is the transmitted sequence, then the receiver receives (BDA$^t$) Ab=BDb. If the receiver then multiplies BDb by the conjugate transpose of B, the result is B$^t$ B Db=Db, which is the transmitted sequence b multiplied by a diagonal matrix D having all non-negative values, the diagonal values of D being the singular values. As such, "scaling out the singular values" refers to dividing each component of Db by the singular values. Or, equivalently, "scaling out the singular values" refers to multiplying Db by the inverse of D (which can be denoted by D$^{-1}$). As a result, the transmitter obtains D$^{-1}$Db=b, which is the transmitted sequence.

A significant challenge with MIMO systems is that as the number of antennas increases, the complexity of matrix multiplications (such as those discussed above) grows with $O(t^2)$ for the transmitter and $O(r^2)$ for the receiver. Many known practical MIMO systems are relatively small (e.g., 2-4 antennas), however as systems and data rate requirements grow, known methods will cease to be sufficient. The general inability to computationally handle the unitary transformation for a larger antenna array will be prohibitive for growth in these systems.

Embodiments set forth herein address the foregoing challenges by leveraging UBDM and the associated large class of unitary matrices that can be applied in a fast manner. If the codebooks are selected from the set of "fast" matrices, then the complexity of a MIMO system will grow with $O(t \log t)$ for the transmitter and $O(r \log r)$ for the receiver, thus representing a drastic improvement over the current state of the art.

Application areas in which embodiments of the present disclosure are expected to be of significant value are Internet of Things (IoT) and "Massive" MIMO systems. As IoT continues to grow, there will be more and more devices, all vying for bandwidth. Because the devices will generally be very small, very low power, very low complexity devices, spatial diversity alone will be insufficient for achieving higher data rates (e.g., it may not be possible to successfully increase bandwidth and/or the power of the transmission). With the fast unitary matrices set forth herein, by contrast, systems effective for increasing transmission bandwidth and/or power of the transmission can be implemented, in a reliable and cost-effective manner. Moreover, in some embodiments system designers can use one or more of: standard time division multiplexing, frequency division multiplexing, code division multiplexing (e.g., via the Code Division Multiple Access (CDMA) feature of UBDM), and spatial multiplexing (e.g., due to the reduction in MIMO pre-coding complexity due to the fast unitary matrices) during system design, resulting in improved design flexibility. Alternatively or in addition, when using UBDM, designers can omit the logic/chip set typically used for standard encryption, saving significant power draw, battery life, delay and latency in the network, physical space on the chip, and all of the overhead associated with encryption. Alternatively or in addition, the reduced Peak-to-Average Power Ratio (PAPR) in UBDM (as compared with OFDM) can increase battery life significantly. Alternatively or in addition, with UBDM, faster key exchange can be achieved with fewer computational resources than traditional public key algorithms. The Direct Sequence Spread Spectrum (DSSS) feature of UBDM can also provide a central hub that constantly reallocates codes among different users depending on desired data rate/bandwidth usage.

Embodiments set forth herein are also compatible with "Massive MIMO" systems (i.e., systems whose main application is for the "last mile" problem of achieving desired data rates within "fiber to the home" services, such as Verizon® Fios®). A Massive MIMO system typically operates at millimeter wave center frequencies, have enormous spectral bandwidths (on the order of GHz), and exploit enormous spatial/MIMO diversity (on the order of r=1,000-10,000 transmit antennas). Although such a configuration multiplies the capacity by a factor of 1,000-10,000, the computational complexity of such a system (requiring at $O(1,000^2)=O(1,000,000)$ on the low end) renders it impractical. By using the unitary matrix construction from fUBDM according to embodiments set forth herein, practical Massive MIMO systems can be realized.

System Overview

FIG. 1 is a block diagram illustrating an example very large (e.g., 1,000-10,000 transmit antennas) multiple-in multiple-out (MIMO) communications system for fast spatial unitary transformation, according to an embodiment. As shown in FIG. 1, a system 100 includes a first communication device 120 and a second communication device 150. The first communication device 120 includes processing circuitry 122, transceiver circuitry 146, antennas 148 (which may be large in number), and non-transitory processor-readable memory 124. Similarly, the second communication device 150 includes processing circuitry 152, transceiver circuitry 176, antennas 178 (which may be large in number), and non-transitory processor-readable memory 154. The memory 124 of the first communication device 120 can store one or more of: a codebook of transformation matrices 126, symbols 128, transformed symbols 130, permutations 132, primitive transformation matrices 134, permuted symbols 136, signals 138, precode matrices 140, unitary matrices 142, and layers 144. Similarly, the memory 154 of the second communication device 150 can store one or more of: a codebook of transformation matrices 156, symbols 158, transformed symbols 160, permutations 162, primitive transformation matrices 164, permuted symbols 166, signals 168, precode matrices 170, unitary matrices 172, and layers 174. The antennas 148 and/or the antennas 178 can be configured to perform Multiple Input Multiple Output (MIMO) operations.

Each of the memories 124 and 154 can store instructions, readable by the associated processing circuitry (122 and 152, respectively) to perform method steps, such as those shown and described with reference to FIGS. 2-5 below. Alternatively or in addition, instructions and/or data (e.g., a codebook of transformation matrices 126, symbols 128, transformed symbols 130, permutations 132, primitive transformation matrices 134, permuted symbols 136, signals 138, precode matrices 140, unitary matrices 142, and layers 144) can be stored in media 112 and/or 114 and accessible to the first communication device 120 and/or the second communication device 150, respectively.

Figure 2:
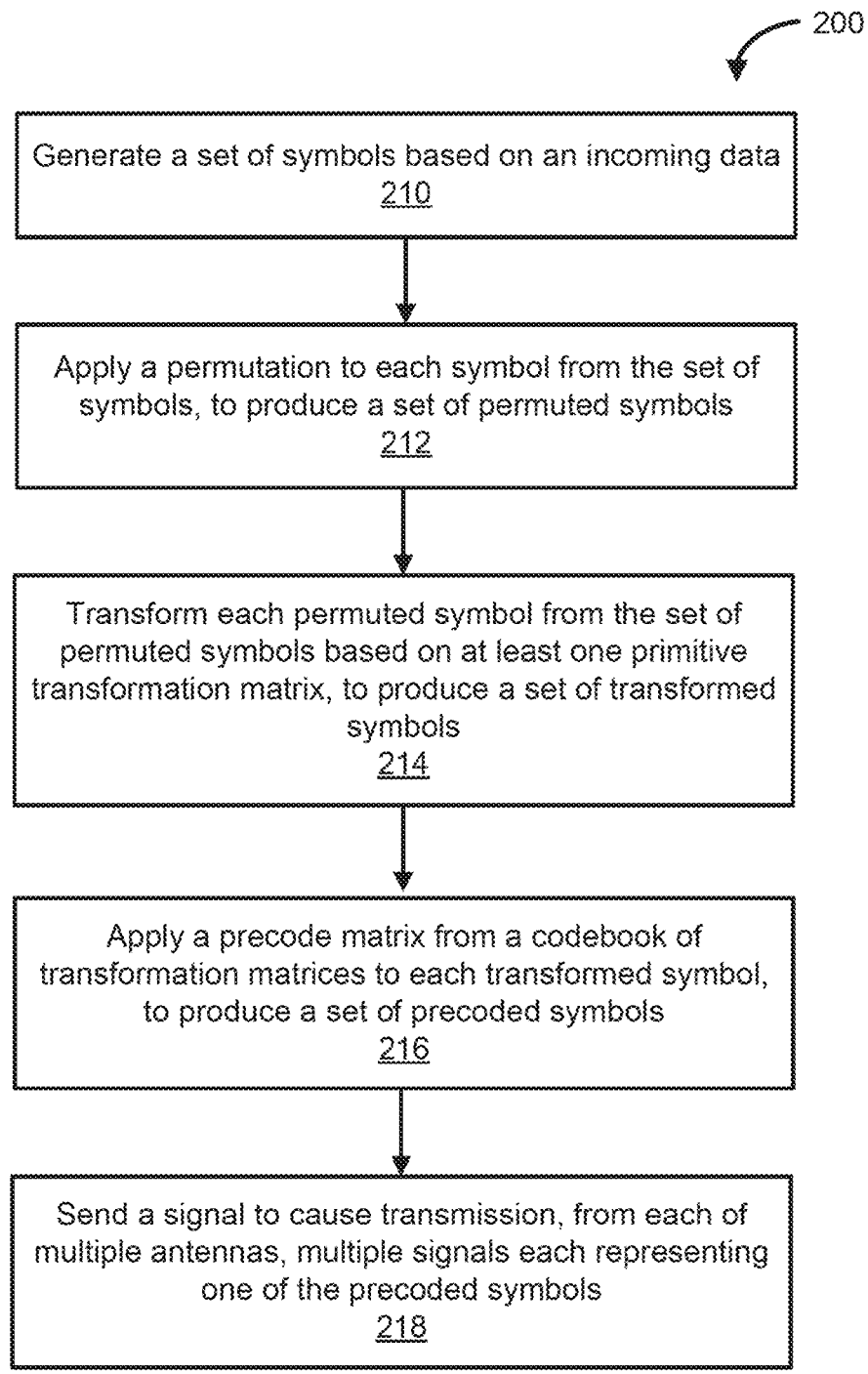
FIG. 2 is a flowchart illustrating a first example method for performing fast spatial unitary transformation, including generating and transmitting precoded symbols, according to an embodiment.

FIG. 2 is a flowchart illustrating a first example method for performing fast spatial unitary transformation, including generating and transmitting precoded symbols, according to an embodiment. The method 200 can be implemented, for example, using the MIMO communications system 100 of FIG. 1. As shown in FIG. 2, the method 200 includes generating a set of symbols, at 210, based on an incoming data (i.e., any input data stream, which can include packets, which can include data that may or may not be serialized, etc.), and apply a permutation to each symbol from the set of symbols, at 212, to produce a set of permuted symbols. At 214, each permuted symbol from the set of permuted symbols is transformed based on at least one primitive transformation matrix, to produce a set of transformed symbols. A precode matrix selected (e.g., pseudo-randomly) from the codebook of transformation matrices is applied, at 216, to each transformed symbol from the set of transformed symbols to produce a set of precoded symbols. The codebook of transformation matrices is accessible to a second communication device, and optionally does not include a frequency-domain transformation or a time-domain transformation. The codebook of transformation matrices can be configured for use in at least one of: time division multiplexing, frequency division multiplexing, code division multiplexing, or spatial multiplexing. At 218, a signal is sent to cause transmission, to the second communication device, of multiple signals, each signal from the multiple signals representing a precoded symbol from the set of precoded symbols, each signal from the multiple signals transmitted using a unique antenna from the set of antennas. The multiple signals can be sent via a communication channel that applies a channel transformation to the plurality of signals such that the precode matrix is removed. In some implementations, the signal to cause transmission of the multiple signals does not cause transmission of any of the precode matrices and/or does not cause transmission of the codebook of transformation matrices.

In some embodiments, the method 200 also includes generating the codebook of precode matrices by decomposing a unitary transformation matrix into a plurality of layers, each layer from the plurality of layers including a permutation and a primitive transformation matrix. Alternatively or in addition, the multiple antennas are a first set of antennas and the second communication device includes a second set of antennas, the first communication device and the second communication device configured to perform MIMO operations. The first set of antennas can include T antennas and the second set of antennas can include R antennas, the MIMO operations having an associated computational cost of $O(T \log_2 T)$ arithmetic operations for the first communication device, and the MIMO operations having an associated cost of $O(R \log_2 R)$ arithmetic operations for the second communication device.

Figure 3:
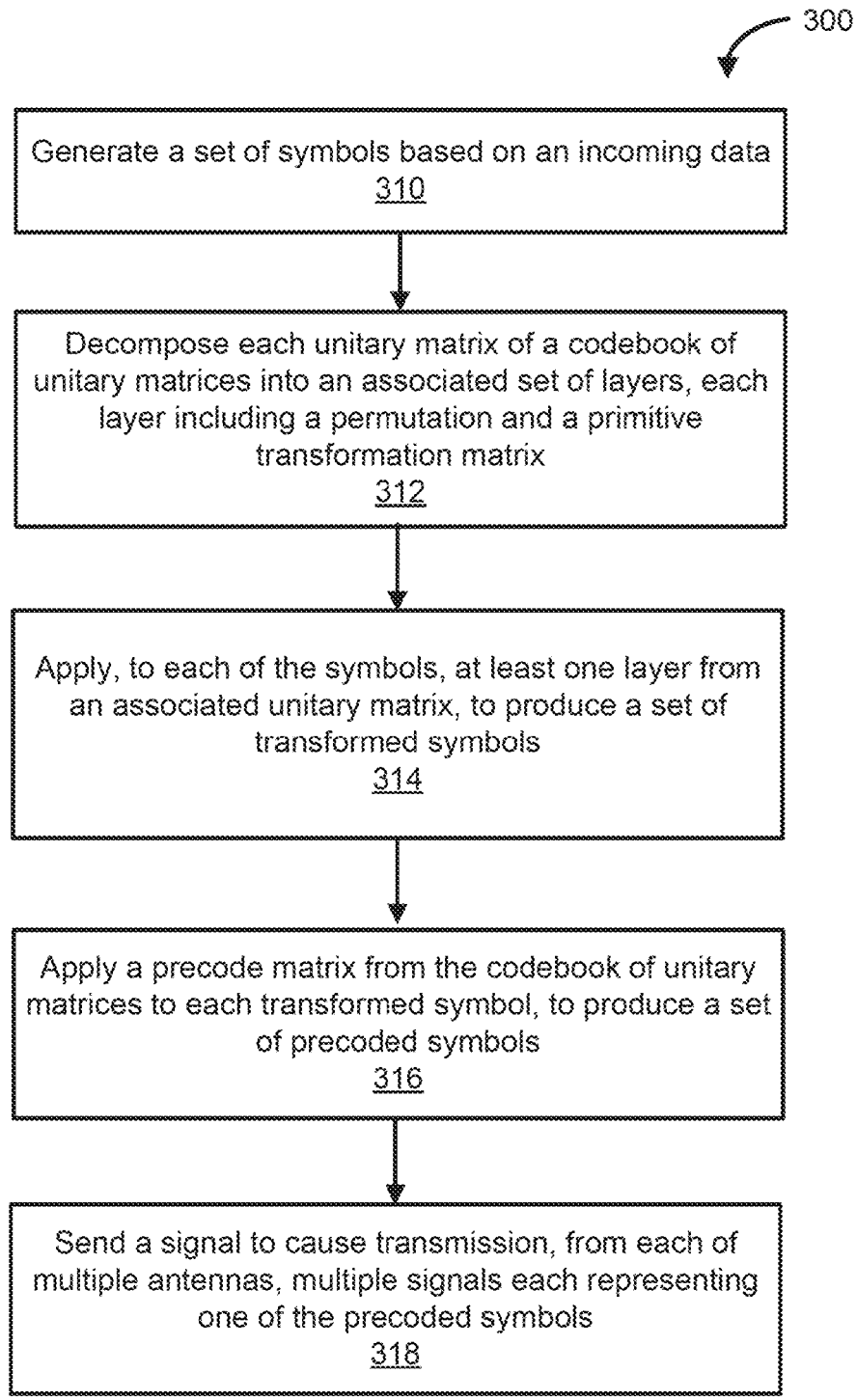
FIG. 3 is a flowchart illustrating a second example method for performing fast spatial unitary transformation, including generating and transmitting precoded symbols, according to an embodiment.

FIG. 3 is a flowchart illustrating a second example method for performing fast spatial unitary transformation, including generating and transmitting precoded symbols, according to an embodiment. The method 300 can be implemented, for example, using the MIMO communications system 100 of FIG. 1. As shown in FIG. 3, the method 300 includes generating, at 310, a set of symbols based on an incoming data, and decomposing, at 312, each unitary matrix from a plurality of unitary matrices of the codebook of unitary matrices into an associated set of layers. For each unitary matrix from the plurality of unitary matrices, each layer from the plurality of layers associated with that unitary matrix can include a permutation and a primitive transformation matrix. At 314, at least one layer from an associated unitary matrix from the plurality of unitary matrices is applied to each symbol from the set of symbols, to generate a set of transformed symbols. At 316, a precode matrix selected from the codebook of unitary matrices is applied to each transformed symbol from the set of transformed symbols, to produce a set of precoded symbols. A signal is sent at 318 to cause transmission, to the second communication device, of multiple signals. Each signal from the multiple signals represents a precoded symbol from the set of precoded symbols. Each signal from the multiple signals is transmitted using a unique antenna from a set of multiple antennas. In some implementations, the signal to cause transmission of the multiple signals does not cause transmission of any of the precode matrices and/or does not cause transmission of the codebook of transformation matrices.

In some embodiments, the set of multiple antennas is a first set of antennas, and the second communication device includes a second set of antennas, the first communication device and the second communication device configured to perform MIMO operations. The first plurality of antennas can include T antennas and the second plurality of antennas can include R antennas. The MIMO operations can have an associated computational cost of $O(T \log_2 T)$ arithmetic operations for the first communication device, and the MIMO operations can have an associated computational cost of $O(R \log_2 R)$ arithmetic operations for the second communication device.

Figure 4:
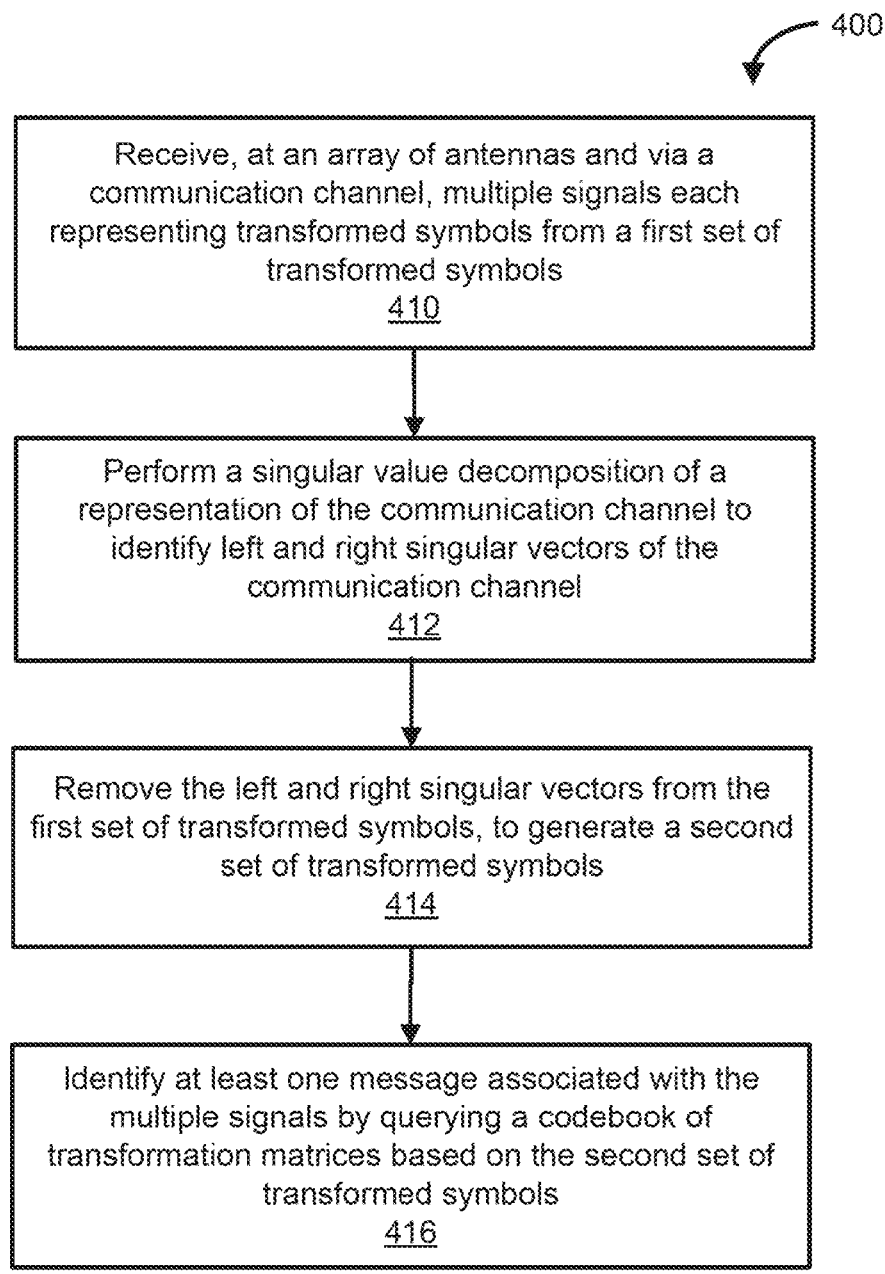
FIG. 4 is a flowchart illustrating an example communication method, including a singular value decomposition and generating transformed signals, according to an embodiment.

FIG. 4 is a flowchart illustrating an example communication method, including a singular value decomposition and generating transformed signals, according to an embodiment. The method 400 can be implemented, for example, using the MIMO communications system 100 of FIG. 1. As shown in FIG. 4, the method 400 includes receiving, at 410, at an array of antennas of a communication device and via a communication channel, multiple signals. Each signal from the multiple signals represents transformed symbols from a first set of transformed symbols. At 412, a singular value decomposition is performed, at the communication device, of a representation of the communication channel to identify a left singular vector of the communication channel and a right singular vector of the communication channel. The singular value decomposition of an m×n real or complex matrix M is a factorization of the form UΣV*, where U is an m×m real or complex unitary matrix, Σ is an m×n rectangular diagonal matrix with non-negative real numbers on the diagonal, and V is an n×n real or complex unitary matrix. The diagonal entries 61 of $\sigma_i$ are known as singular values of M. The columns of U and the column of V are called the left-singular vectors and right-singular vectors of M, respectively. At 414, the left singular vector and the right singular vector are removed from the first set of transformed symbols to generate a second set of transformed symbols. At least one message associated with the plurality of signals is identified at 416 by querying a codebook of transformation matrices based on the second plurality of transformed symbols. Optionally, the codebook of transformation matrices does not include a frequency-domain transformation or a time-domain transformation.

In some embodiments, the method 400 also includes decomposing a unitary transformation matrix into multiple layers to produce the codebook of transformation matrices. Each layer from the multiple layers can include a permutation and a primitive transformation matrix. Alternatively or in addition, the array of antennas is a first array of antennas, and the second communication device includes a second array of antennas, with the first communication device and the second communication device configured to perform MIMO operations. The first array of antennas can include R antennas and the second array of antennas can include T antennas. The MIMO operations can have an associated computational cost of $O(R \log_2 R)$ arithmetic operations for the first communication device, and the MIMO operations can have an associated computational cost of $O(T \log_2 T)$ arithmetic operations for the second communication device.

Example Fast Unitary Transformations—System and Methods

Figure 5:
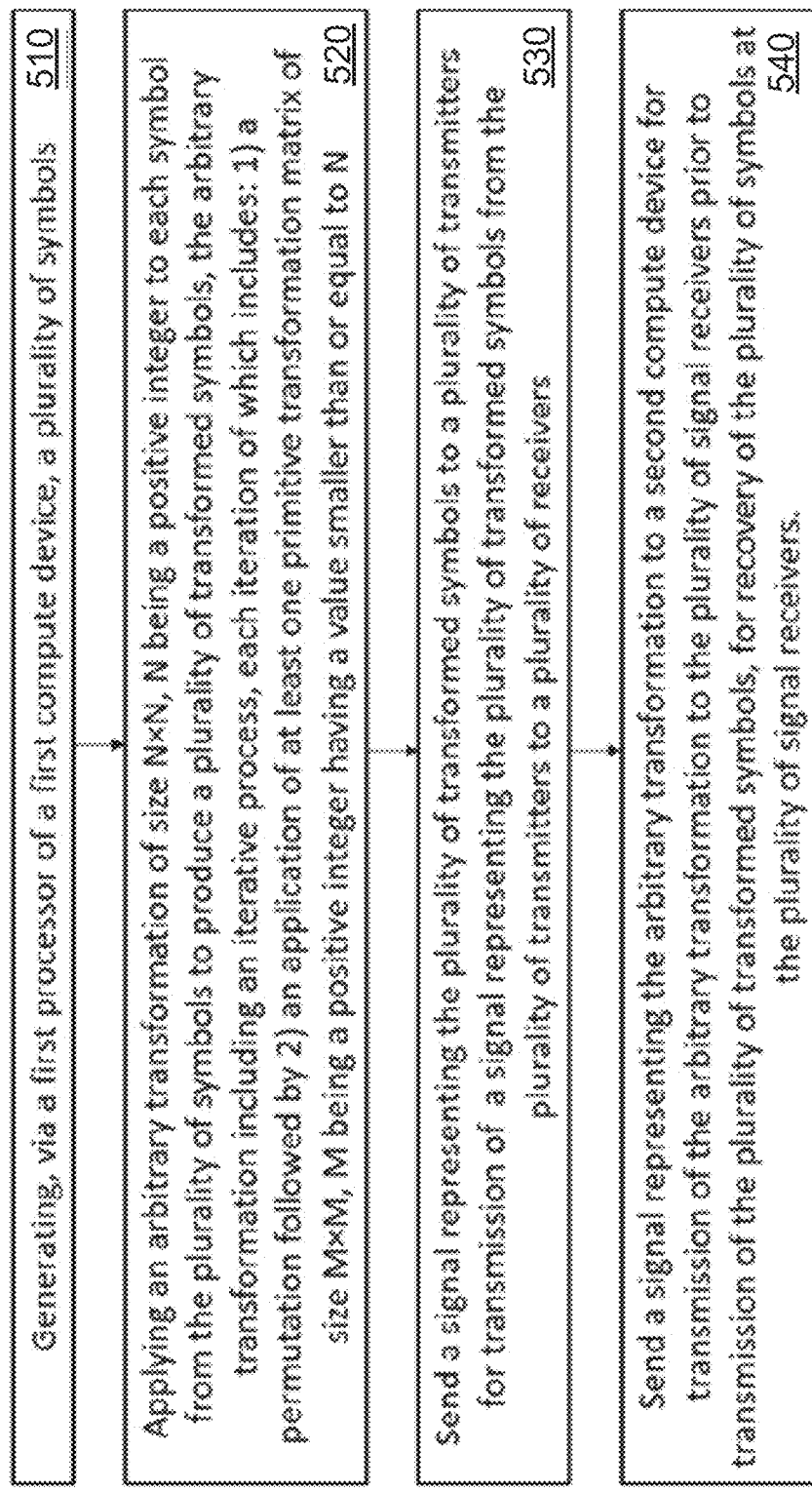
FIG. 5 is a flowchart illustrating a method of communication using a layered construction of an arbitrary matrix, according to an embodiment.

FIG. 5 is a flowchart illustrating a method of communication using a layered construction of an arbitrary matrix, according to an embodiment. The method 500 includes, at 510, generating, via a first processor of a first compute device, a plurality of symbols. The method 500 also includes, at 520, applying an arbitrary transformation of size N×N to each symbol from the plurality of symbols to produce a plurality of transformed symbols, where N is a positive integer. The arbitrary transformation includes an iterative process (e.g., including multiple layers), and each iteration includes: 1) a permutation followed by 2) an application of at least one primitive transformation matrix of size M×M, where M is a positive integer having a value smaller than or equal to N.

At 530, a signal representing the plurality of transformed symbols is sent to a plurality of transmitters, which transmits a signal representing the plurality of transformed symbols to a plurality of receivers. The method 500 also includes, at

540, sending a signal representing the arbitrary transformation to a second compute device for transmission of the arbitrary transformation to the plurality of signal receivers prior to transmission of the plurality of transformed symbols, for recovery of the plurality of symbols at the plurality of signal receivers.

In some embodiments, the plurality of signal receivers includes a plurality of antenna arrays, and the plurality of signal receivers and the plurality of signal transmitters are configured to perform Multiple Input Multiple Output (MIMO) operations. In some embodiments, the arbitrary transformation includes a unitary transformation. In some embodiments, the arbitrary transformation includes one of a Fourier transform, a Walsh transform, a Haar transform, a slant transform, or a Toeplitz transform.

In some embodiments, each primitive transformation matrix from the at least one primitive transformation matrix has a dimension (e.g., a length) with a magnitude of 2, and a number of iterations of the iterative process is $\log_2 N$. In some embodiments, any other appropriate lengths can be used for the primitive transformation matrix. For example, the primitive transformation matrix can have a length greater than 2 (e.g., 3, 4, 5, etc.). In some embodiments, the primitive transformation matrix includes a plurality of smaller matrices having diverse dimensions. For example, the primitive transformation matrix can include block-U(m) matrices, where m can be different values within a single layer or between different layers.

The fast matrix operations in the method 500 (e.g., 520) can be examined in more detail with reference to Discrete Fourier Transform (DFT). Without being bound by any particular theory or mode of operation, the DFT of a vector $\overline{b}=(b_0, b_1, \ldots ; b_{N-1})$, denoted $\overline{B}$, with components $B_k$, can be given by:

$$B_k = \sum_{n=0}^{N-1} b_n w_N^{nk} \quad (18)$$

where $$\omega_N = e^{\frac{2\pi i}{N}}.$$

Generally, a DFT involves $N^2$ multiplies when carried out using naive matrix multiplication, as illustrated by Equation (18). The roots of unity $\omega_N$, however, have a set of symmetries that can reduce the number of multiplications. To this end, the sum in Equation (18) can be separated into even and odd terms, as (assuming for now that N is a multiple of 2):

$$B_k = \sum_{n=0}^{\frac{N}{2}-1} b_{2n} w_N^{2nk} + \sum_{n=0}^{\frac{N}{2}-1} b_{2n+1} w_N^{(2n+1)k} \quad (19)$$

$$= \sum_{n=0}^{\frac{N}{2}-1} b_{2n} w_N^{2nk} + \sum_{n=0}^{\frac{N}{2}-1} b_{2n+1} w_N^{2nk}$$

In addition:

$$w_N^{2nk} = e^{\frac{2\pi i 2nk}{N}} = e^{\frac{2\pi ink}{N/2}} = w_{N/2}^{nk} \quad (20)$$

So $B_k$ can be written as:

$$B_k = \sum_{n=0}^{\frac{N}{2}-1} b_{2n} w_{N/2}^{nk} + w_N^k \sum_{n=0}^{\frac{N}{2}-1} b_{2n+1} w_{N/2}^{nk} \quad (21)$$

Now k runs over twice the range of n. But consider the following equation:

$$w^{\frac{n\left(\frac{N}{2}+k\right)}{N/2}} = e^{\frac{2\pi in\left(\frac{N}{2}+k\right)}{N/2}} = e^{2\pi in} e^{\frac{2\pi ink}{N/2}} = e^{\frac{2\pi ink}{N/2}} \quad (22)$$

As a result, the "second half" of the k values in the N/2 point Fourier transform can be readily computed.

In DFT, the original sum to get $B_k$ involves N multiplications. The above analysis breaks the original sum into two sets of sums, each of which involves N/2 multiplications. Now the sums over n are from 0 to N/2−1, instead of being over the even or odds. This allows one to break them apart into even and odd terms again in exactly the same way as done above (assuming N/2 is also a multiple of 2). This results in four sums, each of which has N/4 terms. If N is a power of 2, the break-down process can continue all the way down to 2 point DFT multiplications.

Figure 6:
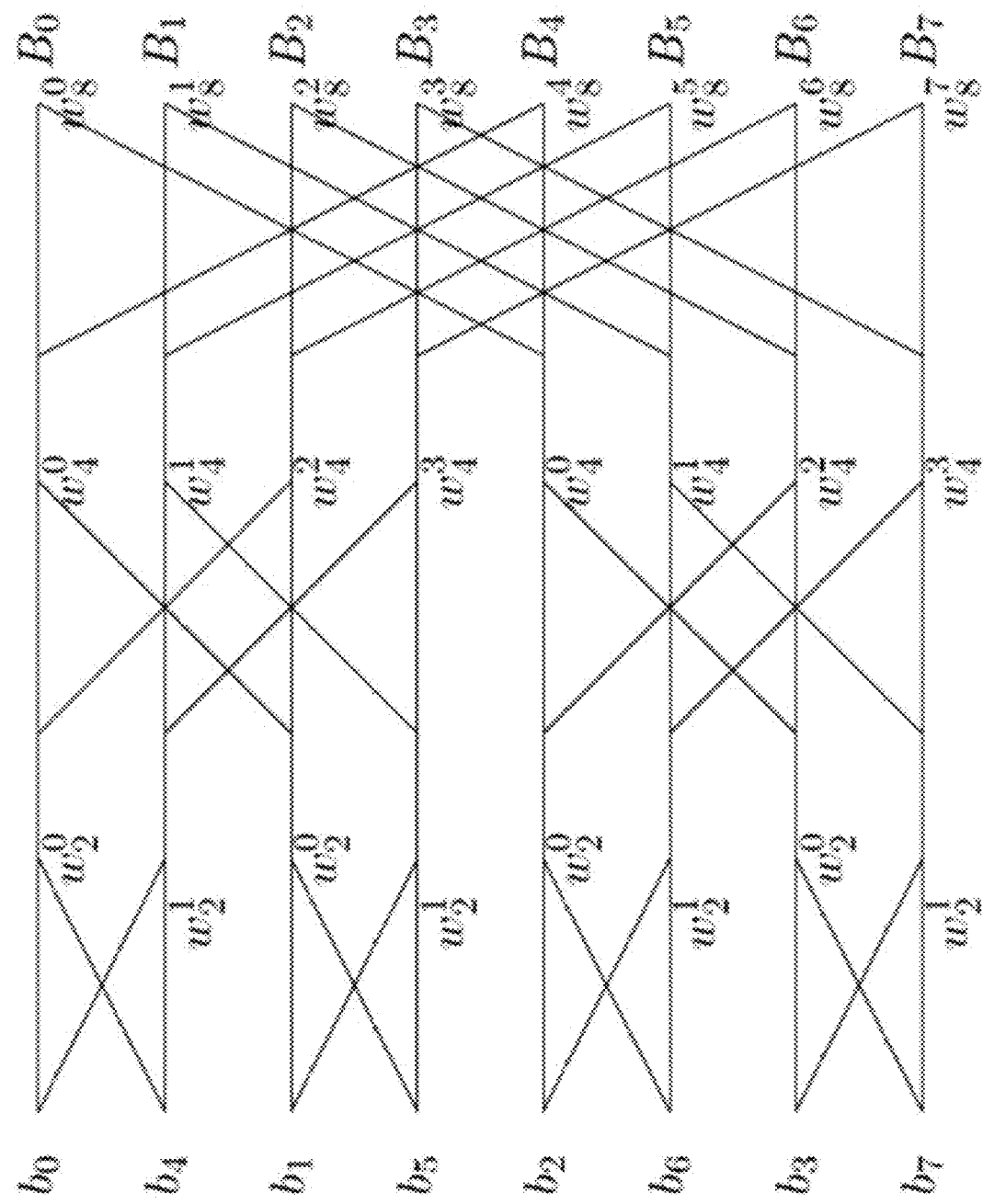
FIG. 6 is a diagram illustrating discrete Fourier Transform (DFT) of a vector $\bar{b}=(b_0, b_1, \ldots b_{N-1})$.

FIG. 6 is a diagram illustrating discrete Fourier Transform (DFT) of a vector $\overline{b}=(b_0, b_1, \ldots b_{N-1})$. The $\omega_N$ values are multiplied by the number on the lower incoming line to each node. At each of the three columns in FIG. 6, there are N multiplications, and the number of columns can be divided by 2 before reaching 2, i.e., log(N). Accordingly, the complexity of this DFT is O(N*log N).

The analysis above can be extended beyond the context of DFT as follows. First, a permutation is performed on incoming values in a vector to generate permutated vector. Permutations are usually O(1) operations. Then, a series of U(2) matrix multiplies is performed on the pairs of elements of the permuted vector. The U(2) values in the first column of the DFT example above are all:

$$\begin{pmatrix} 1 & 1 \\ 1 & -1 \end{pmatrix} \quad (23)$$

The U(2) matrix multiplication can be performed using other matrices as well (other than the one shown in (23)). For example, any matrix $A \in U(2) \oplus U(2) \oplus \ldots \oplus U(2)$ can be used, where $\oplus$ designates a direct sum, giving this matrix a block diagonal structure.

The combination of one permutation and one series of U(2) matrix multiplications can be regarded as one layer as described herein. The process can continue with additional layers, each of which includes one permutation and multiplications by yet another matrix in $U(2) \oplus \ldots \oplus U(2)$. In some embodiments, the layered computations can repeat for about log(N) times. In some embodiments, the number of layers can be any other values (e.g., within the available computational power).

The result of the above layered computations includes a matrix of the form:

$$A_{\log N} P_{\log N} \ldots A_2 P_2 A_1 P_1 \overline{b} \quad (24)$$

where $A_i$ represents the $i_{th}$ series of matrix multiplications and Pi represents the $i_{th}$ permutation in the $i_{th}$ layer.

Because permutations and the A matrices are all unitary, the inverse can also be readily computed. In the above layered computation, permutations are computationally free, and the computational cost is from the multiplications in the $A_i$ matrices. More specifically, the computation includes a total of 2N multiplications in each $A_i$ and there are log(N) of the $A_i$ matrices. Accordingly, the computation includes a total of 2N*log(N), or O(N*log(N)) operations, which are comparable to the complexity of OFDM.

The layered computation can be applied with any other block-U(m) matrices. For example, the $A_i$ matrix can be $A_i$=U(3)⊕ ... ⊕EDU(3) or $A_i$=U(4)⊕ ... ⊕U(4). Any other number of m can also be used. In addition, any combination of permutations and block-U(m) matrices can also be used in this layered computation allowable.

In some embodiments, the permutation and the block-U(m) transformation within one layer can be performed in a non-consecutive manner. For example, after the permutation, any other operations can be performed next before the block-U(m) transformation. In some embodiments, a permutation is not followed by another permutation because permutations are a closed subgroup of the unitary group. In some embodiments, a block-U(m) transformation is not followed by another block-U(m) transformation because they also form a closed subgroup of the unitary group. In other words, denote $B_n$ as a block-U(n) and P as permutation, then operations like $PB_n$"$PB_n$$PB_n$$B_n$b and $PB_n$"$B_n$"$B_n$$PB_n$$P\overline{b}$ can be performed. In contrast, operations like $PB_n$$PP\overline{b}$ and $B_n$$PB_n$$B_n$$\overline{b}$ can be redundant because two permutations or two block-U(m) transformations are consecutive here.

The layered approach to construct unitary matrices can also ensure the security of the resulting communication systems. The security of the resulting communication can depend on the size of the matrix space of fast unitary matrices compared to the full group U(N).

Figure 7:
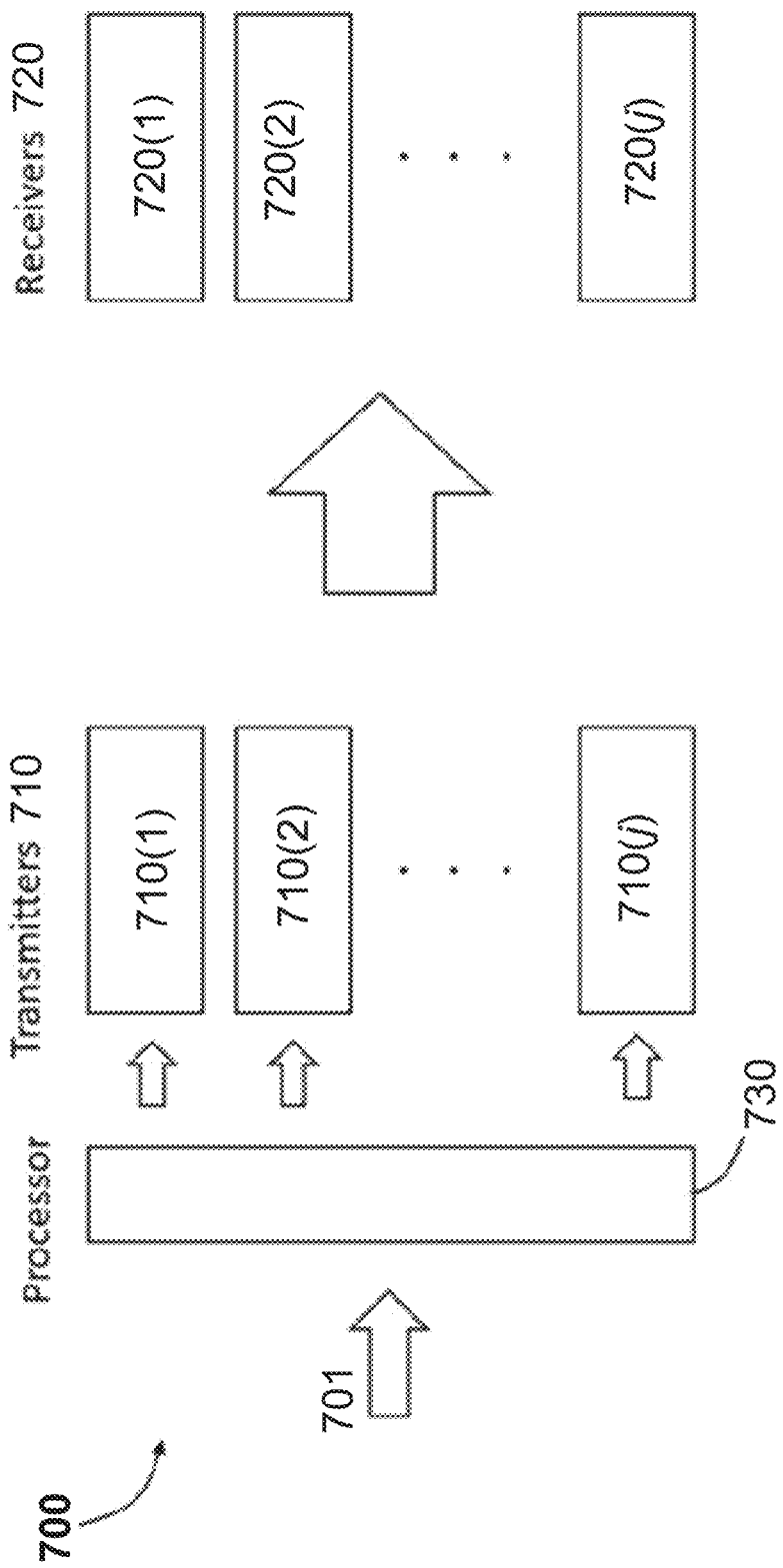
FIG. 7 is a schematic of a system for communication using layered construction of unitary matrices, according to an embodiment.

FIG. 7 is a schematic of a system for communication using layered construction of unitary matrices, according to an embodiment. The system 700 includes a plurality of signal transmitters 710(1) to 710(i) (collectively referred to as transmitters 710) and a plurality of signal receivers 720(1) to 720(j) (collectively referred to as receivers 720), where i and j are both positive integers. In some embodiments, i and j can equal. In some other embodiments, i can be different from j. In some embodiments, the transmitters 710 and the receivers 720 are configured to perform Multiple Input Multiple Output (MIMO) operations.

In some embodiments, each transmitter 710 includes an antenna and the transmitters 710 can form an antenna array. In some embodiments, each receiver includes an antenna and the receivers 720 can also form an antenna array.

The system 700 also includes a processor 730 operably coupled to the signal transmitters 710. In some embodiments, the processor 730 includes a single processor. In some embodiments, the processor 730 includes a group of processors. In some embodiments, the processor 730 can be included in one or more of the transmitters 710. In some embodiments, the processor 720 can be separate from the transmitters 710. For example, the processor 730 can be included in a compute device configured to process the incoming data 701 and then direct the transmitters 710 to transmit signals representing the incoming data 701.

The processor 730 is configured to generate a plurality of symbols based on an incoming data 701 and decompose a unitary transformation matrix of size N×N into a set of layers, where N is a positive integer. Each layer includes a permutation and at least one primitive transformation matrix of size M×M, where M is a positive integer smaller than or equal to N.

The processor 730 is also configured to encode each symbol from the plurality of symbols using at least one layer from the set of layers to produce a plurality of transformed symbols. A signal representing the plurality of transformed symbols is then sent to the plurality of transmitters 710 for transmission to the plurality of signal receivers 720. In some embodiments, each transmitter in the transmitters 710 can communicate with any receiver in the receivers 720.

In some embodiments, the processor 730 is further configured to send a signal representing one of: (1) the unitary transformation matrix, or (2) an inverse of the unitary transformation matrix, to the receivers 720, prior to transmission of the signal representing the transformed symbols to the signal receivers 720. This signal can be used to by the signal receivers 720 to recover the symbols generated from the input data 701. In some embodiments, the unitary transformation matrix can be used for symbol recovery. In some embodiments, the recovery can be achieved by using the inverse of the unitary transformation matrix.

In some embodiments, the fast unitary transformation matrix includes one of a Fourier matrix, a Walsh matrix, a Haar matrix, a slant matrix, or a Toeplitz matrix. In some embodiments, the primitive transformation matrix has a dimension (e.g., a length) with a magnitude of 2 and the set of layers includes $\log_2$ N layers. In some embodiments, any other length can be used as described above. In some embodiments, the signal receivers 720 are configured to transmit a signal representing the plurality of transformed symbols to a target device. Although embodiments shown and described herein refer to MIMO systems (e.g., single-user MIMO systems (SU-MIMO)) having multiple transmitter antennas and multiple receiver antennas, methods set forth herein are also applicable to other systems such as multiple-user MIMO systems (MU-MIMO) which can include a single transmitting antenna but multiple receiver antennas, or multiple transmitting antennas with a single receiver antenna.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium, see for example, media 112 and 114 in FIG. 1) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. An apparatus, comprising:
a first communication device including a plurality of antennas, and configured to access a codebook of transformation matrices; and
a processor operatively coupled to the first communication device, the processor configured to:
generate a plurality of symbols based on an incoming data;
apply a permutation to each symbol from the plurality of symbols, to produce a plurality of permuted symbols;
transform each permuted symbol from the plurality of permuted symbols based on at least one primitive transformation matrix, to produce a plurality of transformed symbols;
apply, to each transformed symbol from the plurality of transformed symbols, a precode matrix selected from the codebook of transformation matrices, the codebook of transformation matrices accessible to a second communication device, to produce a plurality of precoded symbols; and
send a signal to cause transmission, to the second communication device, of a plurality of signals, each signal from the plurality of signals representing a precoded symbol from the plurality of precoded symbols, each signal from the plurality of signals transmitted using a unique antenna from the plurality of antennas.

2. The apparatus of claim 1, wherein the processor is further configured to:
generate the codebook of transformation matrices by decomposing a unitary transformation matrix into a plurality of layers, each layer from the plurality of layers including a permutation and a primitive transformation matrix.

3. The apparatus of claim 1, wherein the precode matrix from the codebook of transformation matrices is selected pseudo-randomly.

4. The apparatus of claim 1, wherein the plurality of antennas is a first plurality of antennas separate from a second plurality of antennas of the second communication device, the first communication device configured to perform Multiple Input Multiple Output (MIMO) operations.

5. The apparatus of claim 1, wherein:
the plurality of antennas is a first plurality of antennas, and
the second communication device includes a second plurality of antennas, the first communication device and the second communication device configured to perform MIMO operations,
the first plurality of antennas including T antennas and the second plurality of antennas including R antennas, the MIMO operations having an associated computational cost of $O(T \log_2 T)$ arithmetic operations for the first communication device, and the MIMO operations having an associated cost of $O(R \log_2 R)$ arithmetic operations for the second communication device.

6. The apparatus of claim 1, wherein the codebook of transformation matrices does not include a frequency-domain transformation or a time-domain transformation.

7. The apparatus of claim 1, wherein the codebook of transformation matrices is configured for use in at least one of: time division multiplexing, frequency division multiplexing, code division multiplexing, or spatial multiplexing.

8. The apparatus of claim 1, wherein the processor is configured to transmit the plurality of signals via a communication channel that applies a channel transformation to the plurality of signals such that the precode matrix is removed.

9. The apparatus of claim 1, wherein the signal to cause transmission of the plurality of signals does not cause transmission of any of the precode matrices.

10. The apparatus of claim 1, wherein the signal to cause transmission of the plurality of signals does not cause transmission of the codebook of transformation matrices.

11. A method, comprising:
generating, via a processor associated with a first communication device, a plurality of symbols based on an incoming data;
applying, via the processor, a permutation to each symbol from the plurality of symbols, to produce a plurality of permuted symbols;
transforming, via the processor, each permuted symbol from the plurality of permuted symbols based on at least one primitive transformation matrix, to produce a plurality of transformed symbols;
applying, to each transformed symbol from the plurality of transformed symbols and via the processor, a precode matrix selected from a codebook of transformation matrices, the codebook of transformation matrices accessible to the first communication device and to a second communication device different from the first communication device, to produce a plurality of precoded symbols; and
sending, via the processor and to the second communication device, a signal representing a plurality of signals, each signal from the plurality of signals representing a precoded symbol from the plurality of precoded symbols, each signal from the plurality of signals transmitted using a unique antenna from a plurality of antennas of the first communication device.

12. The method of claim 11, wherein the signal to cause transmission of the plurality of signals at least one of:
does not cause transmission of any of the precode matrices; or
does not cause transmission of the codebook of transformation matrices.

13. The method of claim 11, wherein the codebook of transformation matrices does not include a frequency-domain transformation or a time-domain transformation.

14. The method of claim 11, wherein the codebook of transformation matrices is configured for use in at least one of: time division multiplexing, frequency division multiplexing, code division multiplexing, or spatial multiplexing.

15. The method of claim 11, wherein the precode matrix from the codebook of transformation matrices is selected pseudo-randomly.

16. A non-transitory, processor-readable medium storing instructions that, when executed by a processor that is associated with a first communication device, cause the processor to:
generate a plurality of symbols based on an incoming data;
apply a permutation to each symbol from the plurality of symbols, to produce a plurality of permuted symbols;
transform each permuted symbol from the plurality of permuted symbols based on at least one primitive transformation matrix, to produce a plurality of transformed symbols;
apply, to each transformed symbol from the plurality of transformed symbols, a precode matrix selected from a codebook of transformation matrices, the codebook of transformation matrices accessible to the first communication device and to a second communication device different from the first communication device, to produce a plurality of precoded symbols; and
send a signal to cause transmission, to the second communication device, of a plurality of signals, each signal from the plurality of signals representing a precoded symbol from the plurality of precoded symbols, each signal from the plurality of signals transmitted using a unique antenna from a plurality of antennas of the first communication device.

17. The non-transitory, processor-readable medium of claim 16, further storing instructions to cause the processor to:
generate the codebook of transformation matrices by decomposing a unitary transformation matrix into a plurality of layers, each layer from the plurality of layers including a permutation and a primitive transformation matrix.

18. The non-transitory, processor-readable medium of claim 16, wherein the signal to cause transmission of the plurality of signals at least one of:
does not cause transmission of any of the precode matrices; or
does not cause transmission of the codebook of transformation matrices.

19. The non-transitory, processor-readable medium of claim 16, wherein the codebook of transformation matrices at least one of:
does not include a frequency-domain transformation or a time-domain transformation, or
is configured for use in at least one of: time division multiplexing, frequency division multiplexing, code division multiplexing, or spatial multiplexing.

20. The non-transitory, processor-readable medium of claim 16, wherein the precode matrix from the codebook of transformation matrices is selected pseudo-randomly.

* * * * *